United States Patent
Kray et al.

(10) Patent No.: US 9,885,244 B2
(45) Date of Patent: Feb. 6, 2018

(54) METAL LEADING EDGE PROTECTIVE STRIPS FOR AIRFOIL COMPONENTS AND METHOD THEREFOR

(71) Applicant: GENERAL ELECTRIC COMPANY, Schenectady, NY (US)

(72) Inventors: Nicholas Joseph Kray, Cincinnati, OH (US); Dong-Jin Shim, Cincinnati, OH (US); Tod Winton Davis, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 291 days.

(21) Appl. No.: 14/418,534

(22) PCT Filed: Jun. 28, 2013

(86) PCT No.: PCT/US2013/048393
§ 371 (c)(1),
(2) Date: Jan. 30, 2015

(87) PCT Pub. No.: WO2014/022039
PCT Pub. Date: Feb. 6, 2014

(65) Prior Publication Data
US 2015/0184527 A1    Jul. 2, 2015

Related U.S. Application Data

(60) Provisional application No. 61/677,179, filed on Jul. 30, 2012.

(51) Int. Cl.
*F01D 5/28* (2006.01)
*F01D 5/26* (2006.01)
(Continued)

(52) U.S. Cl.
CPC .............. *F01D 5/26* (2013.01); *C22C 19/057* (2013.01); *C22C 38/02* (2013.01); *C22C 38/04* (2013.01);
(Continued)

(58) Field of Classification Search
CPC ....... C22C 19/057; C22C 38/54; C22C 38/48; C22C 38/04; C22C 38/02; F01D 5/28
See application file for complete search history.

(56) References Cited

U.S. PATENT DOCUMENTS 4,832,993 A * 5/1989 Coulon ................ B23K 35/005
416/224
5,141,400 A * 8/1992 Murphy ................. B29C 43/18
416/204 A
(Continued)

FOREIGN PATENT DOCUMENTS

CN    1062577 A    7/1992
CN    1847428 A    10/2006
(Continued)

OTHER PUBLICATIONS

AK Steel Corporation, 15-5PH Stainless Steel, 15-5 PH-S-08-01-07, pp. 1-2, published 2007, www.aksteel.com.*
(Continued)

*Primary Examiner* — Matthew W Jellett
(74) *Attorney, Agent, or Firm* — General Electric Company; William Scott Andes

(57) ABSTRACT

A metallic leading edge protective strip adapted to provide impact protection for a leading edge of an airfoil of a turbomachine. The protective strip is formed of a stainless steel or a nickel-based alloy and is denser and provides increased strength and elasticity characteristics as compared to an identical protective strip formed of a titanium-based alloy. The protective strip is particularly suitable for use with
(Continued)

composite blades and allows for thinner airfoils, thereby improving engine efficiency.

5 Claims, 1 Drawing Sheet

(51) Int. Cl.
| | |
|---|---|
| F01D 5/14 | (2006.01) |
| F04D 29/32 | (2006.01) |
| F04D 29/02 | (2006.01) |
| C22C 19/05 | (2006.01) |
| C22C 38/02 | (2006.01) |
| C22C 38/04 | (2006.01) |
| C22C 38/42 | (2006.01) |
| C22C 38/48 | (2006.01) |
| C22C 38/54 | (2006.01) |

(52) U.S. Cl.
CPC .............. *C22C 38/42* (2013.01); *C22C 38/48* (2013.01); *C22C 38/54* (2013.01); *F01D 5/147* (2013.01); *F01D 5/282* (2013.01); *F01D 5/288* (2013.01); *F04D 29/023* (2013.01); *F04D 29/324* (2013.01); *F05D 2220/36* (2013.01); *F05D 2240/303* (2013.01); *F05D 2300/171* (2013.01); *F05D 2300/175* (2013.01); *Y02T 50/672* (2013.01); *Y10T 29/49337* (2015.01)

(56) References Cited

U.S. PATENT DOCUMENTS

| | | | |
|---|---|---|---|
| 5,366,345 A | 11/1994 | Gerdes et al. | |
| 5,456,818 A * | 10/1995 | Houston | F04D 29/266 |
| | | | 205/131 |
| 5,482,437 A * | 1/1996 | Houston | F04D 29/266 |
| | | | 403/359.6 |
| 7,510,778 B2 | 3/2009 | Bernard et al. | |
| 8,807,931 B2 | 8/2014 | Roberts | |
| 2011/0097213 A1 | 4/2011 | Peretti et al. | |
| 2011/0097214 A1 | 4/2011 | Wentworth et al. | |
| 2011/0129600 A1 | 6/2011 | Das | |
| 2011/0194941 A1 | 8/2011 | Parkin et al. | |
| 2012/0003100 A1* | 1/2012 | James | F01D 5/282 |
| | | | 416/230 |

FOREIGN PATENT DOCUMENTS

| | | |
|---|---|---|
| CN | 102116175 A | 7/2011 |
| EP | 0496550 A1 | 7/1992 |
| EP | 0651169 A1 | 5/1995 |
| EP | 2327812 A1 | 6/2011 |
| EP | 2378079 A2 | 10/2011 |
| EP | 2405101 A2 | 1/2012 |
| JP | H10-008211 A | 1/1998 |
| JP | 2001-041002 A | 2/2001 |
| WO | 99/10168 A1 | 3/1999 |

OTHER PUBLICATIONS

Unofficial English Translation of Chinese Office Action issued in connection with corresponding CN Application No. 201380040825.X dated Jul. 3, 2015.

Notification of Reasons for Refusal issued in connection with corresponding JP Application No. 2015525427 dated Apr. 18, 2017.

Fourth Office Action and Search issued in connection with corresponding CN Application No. 201380040825.X dated Jul. 13, 2017.

"AMS 5659 (15-5PH)," CorusGroup, Corus Engineering Steels, p. 1 (Jun. 2003).

* cited by examiner

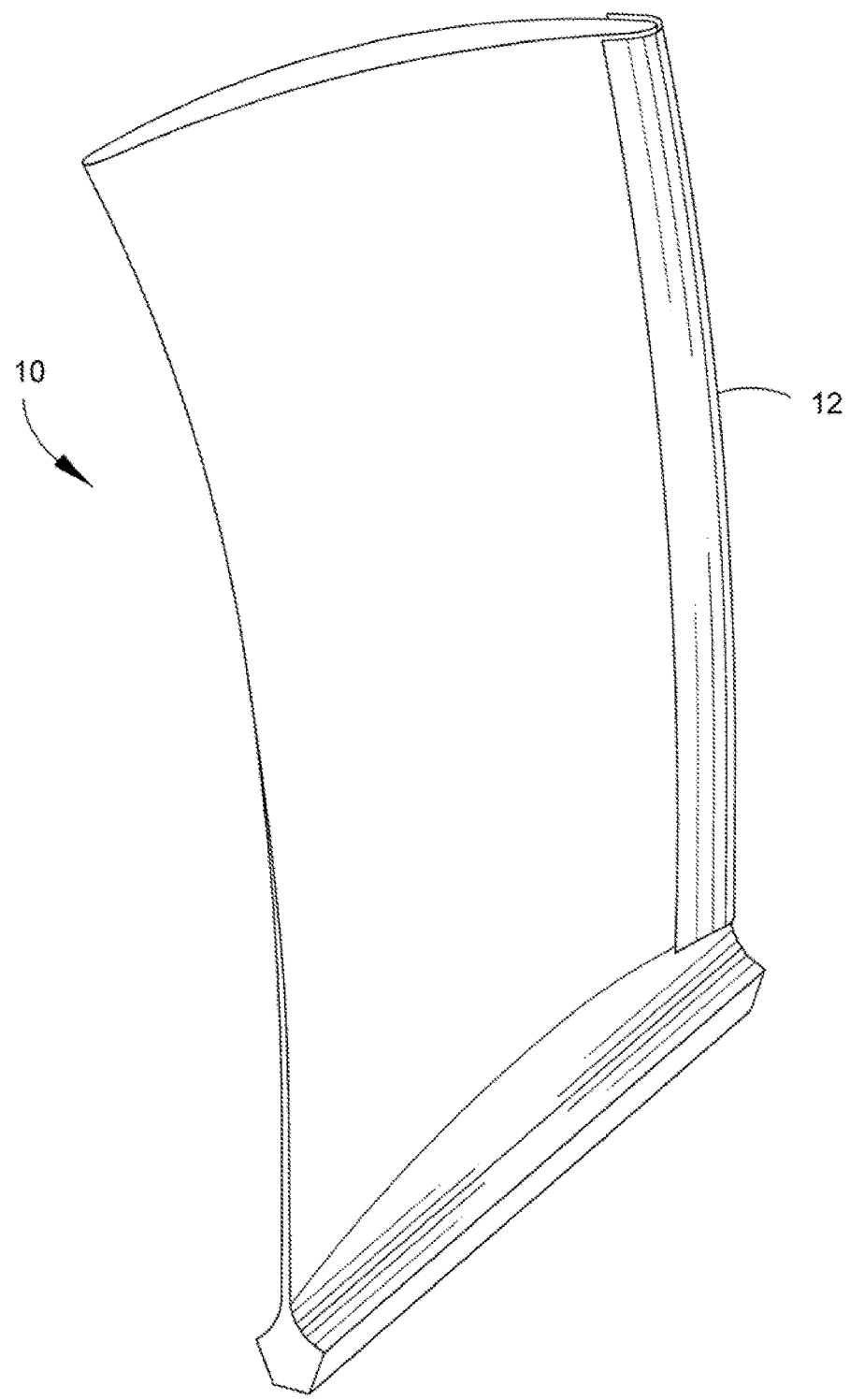

METAL LEADING EDGE PROTECTIVE STRIPS FOR AIRFOIL COMPONENTS AND METHOD THEREFOR

CROSS REFERENCE TO RELATED APPLICATIONS

This is a national stage application under 35 U.S.C. § 371(c) of prior-filed, co-pending, PCT application serial number PCT/US2013/048393, filed on Jun. 28, 2013, which claims priority to U.S. Provisional Application No. 61/677,179, filed Jul. 30, 2012, the contents of which are incorporated herein by reference.

BACKGROUND OF THE INVENTION

The present invention generally relates to leading edge protective strips suitable for composite airfoils. In particular, the present invention relates to metals and alloys employed in protecting the metal leading edge (MLE) of airfoil components.

Many modern gas turbine engine airfoil components, such as fan blades and stator vanes, are constructed of composite laminate or molded fiber. MLEs are used to protect the airfoils of such composite components from impact and erosion damage that can often occur in the engine environment. In conventional practices, a V-shaped protective metallic strip is often wrapped around the leading edge and sides of the airfoil to provide such protection.

Many processes exist for the manufacture of such MLEs and will not be discussed in detail here. Related emerging processes have been disclosed in US Patent applications US2011/0129600A1 and US2011/0097213A1. Additionally, other manufacturing processes, including, for example, traditional machining and creep forming can be used to manufacture MLEs. Creep forming is known in the art as a process in which temperatures high enough to cause plastic deformation of a part are used under pressure to effect the desired shape for the part. An aging treatment can simultaneously occur at the process temperature. To date, a large number of MLEs have been composed primarily of titanium or its alloys due to ease of manufacture and reduced weight. Further, the impact strength of MLEs made of titanium or its alloys has been found to be satisfactory. In US patent application US 2011/0194941A1, Parkin et al. disclose a co-cured sheath for a composite blade. While not intending to promote any particular interpretation, it appears to disclose a method of co-curing the MLE with a polymer matrix composite (PMC) blade structure using a sheath made of titanium, nickel, a titanium alloy or a nickel alloy. Though thinner turbine engine airfoils increase overall blade efficiency, thereby reducing engine specific fuel consumption (SFC), any reduction in the thickness of MLEs made of titanium or its alloys may lead to reduced impact strength of the component.

Impact conditions play a large role in sizing an airfoil. Regardless of the thickness of an airfoil, the MLE must be able to withstand the same or similar impact conditions as does the airfoil. Therefore, in order to significantly reduce the thickness of an engine airfoil, an MLE capable of withstanding the same impact conditions with a lower thickness and hence a lesser volume of material is desired. The utilization of a more dense material with higher yield strength allows for an overall thinner structure resulting in system mechanical properties, such as, for example, bending strength and radial mass, nearly identical to those of titanium or its alloys. One particular goal of aircraft engine research and development is improved SFC, which describes the fuel efficiency of an engine design with respect to, for example, thrust output. Since the metal leading edge is applied to protect the underlying composite blade, a leading edge with reduced thickness without compromising mechanical properties can enhance specific fuel consumption, while at the same time affording the needed protection for the composite blade. Thus, there is an ongoing effort to develop materials capable of improving specific fuel consumption without compromising mechanical properties desired for an MLE.

BRIEF DESCRIPTION OF THE INVENTION

The present invention provides metallic leading edge (MLE) protective strips suitable for use on composite airfoils of the type used in turbomachinery, including fan blades of gas turbine engines. Embodiments of the invention further relate to MLE compositions as a means of improving the strength and density characteristics compared to known MLE compositions.

According to a first aspect of the invention, a metal leading edge protective strip adapted to provide impact protection for an of a turbomachine, formed utilizing a stainless steel or a nickel-based alloy, which is denser and provides increased strength and elasticity characteristics compared to an identical protective strip formed of a titanium-based alloy, is provided.

A second aspect of the invention is a method of making an airfoil having a protective strip utilizing the steps of making an airfoil made of a polymer matrix composite, making a protective strip utilizing nickel-based alloy or stainless alloy using creep forming process or milling, attaching the protective strip to the airfoil using an adhesive, and curing the adhesive to form a bond between the protective strip and the air-foil.

A third aspect of the invention is an airfoil of a turbomachine having a leading edge protected by the metal leading edge protective strip made of either a nickel-base superalloy whose composition is by weight: 50-55% nickel, 17-21% chromium, 2.8-3.33% molybdenum, 4.75-5.5% niobium, 0-1.0% cobalt, 0.65-1.15 titanium, 0.2-0.8% aluminum, 0-0.35% manganese, 0-0.3% copper, 0-0.08% carbon, 0-0.006% boron, the balance iron and incidental impurities; or, a stainless steel alloy whose composition is, by weight: 14-15% chromium, 3.5-5.5% nickel, 0-0.45% niobium, 2.5-4.5% copper, up to 0.07% carbon, up to 1.00% silicon, up to 1.00% manganese, the balance iron and incidental impurities.

A technical effect of embodiments of the invention is the capability of achieving a reduction in specific fuel consumption by reducing the weight and/or thickness of an MLE without substantially compromising the mechanical properties of the MLE.

Another technical effect of embodiments of the invention is the ability to reduce residual stresses by introducing a secondary curing step to attach an MLE to an airfoil.

Other aspects and advantages of this invention will be better appreciated from the following detailed description.

BRIEF DESCRIPTION OF THE DRAWING

FIG. 1 schematically represents a fan blade of a gas turbine engine equipped with an MLE protective strip.

DETAILED DESCRIPTION OF THE INVENTION

Embodiments described herein generally relate to compositions for metallic leading edge (MLE) protective strips for airfoil components of gas turbine engines, and to various characteristics and advantages associated with certain compositions.

FIG. 1 represents a composite fan blade 10 for a gas turbine engine. The blade 10 is of a type known in the art, and its airfoil is represented as having an MLE protective strip 12. While FIG. 1 represents a fan blade for a gas turbine engine, it should be noted that the present invention is not limited to the particular fan blade shown or to airfoils of gas turbine engines.

According to an aspect of the invention, the protective strip 12 has a stainless steel or nickel-based composition. In an embodiment, compositions for the protective strip 12 exhibit increased density, increased modulus of elasticity, and increased strength compared to traditional titanium-based protective strips. Improvements of these three characteristics are intended to contribute to an overall improvement in the capability of the protective strip 12 to withstand impact conditions. Co-curing an MLE with a polymer matrix composite blade structure as described in the previously mentioned US patent application US 2011/0194941A1 to Parkin et al. is deemed unsuitable when employing the high-strength materials of the present invention for the following reason. Since the coefficient of thermal expansion (CTE) of the high-strength materials for the MLE is about 25-60% greater than that of titanium, which has a CTE of about 4.5 ppm/° C., a co-cure operation with a polymer matrix composite laminate, which has a CTE of approximately 1.0 ppm/° C. would increase residual bond stresses that would be difficult to manage during operation of the system. According to an aspect of the present invention, a secondary cure operation (prior curing of the polymer matrix composite blade being termed a primary cure) is used to bond the protective strip 12 to the composite blade 10, allowing for a lower-temperature cure and a more compliant adhesive layer between the protective strip 12 and the underlying composite material of the blade 10. For example, the protective strip 12 can be attached to the composite blade 10 by means of an adhesive that can be cured at a relatively low temperature of about 200-250° F. (about 93-121° C.) using appropriate materials and processes. Adhesives suitable for forming this bond include, but are not limited to, thermosetting epoxy/resin-based adhesives such as AF 191, a product of 3M Company. By comparison, the composite blade 10 is typically cured at a higher temperature, for example, about 325° F. (about 163° C.) or more. Thus the lower-temperature secondary curing process is an aspect for reasons of reducing residual stresses. During the bonding process both the composite base structure of the blade 10 and metallic MLE protective strip 12 are heated to the adhesive cure temperature. During the adhesive cure, both articles expand based on their relative CTE's. The bond is achieved at this elevated adhesive cure temperature, after which the assembly is cooled to room temperature, retaining a residual stress level caused by the CTE mismatch. By keeping this bond cure temperature as low as possible the resultant residual stresses caused by the CTE mismatch can be minimized Since CTE mismatch between the polymer matrix composite blade and MLE increases when using high strength materials such as nickel-based or stainless steel alloys, keeping this bond cure temperature at a minimum, for example, within the range of about 200-250° F. (about 93-121° C.), is highly desirable.

As a result of increased density of the high strength alloys described above relative to titanium and its alloys, the protective strip 12 made of these high-strength materials, in spite of being thinner than those made of titanium and its alloys, is capable of demonstrating mechanical properties similar to those of a larger volume of conventional titanium-based alloys used to form prior art MLEs. By targeting the same load transfer from the leading edge to the underlying composite material of the blade 10, the strains produced in the underlying composite are roughly the same as those produced with a thicker airfoil using traditional titanium-based MLEs. Hence, it is possible to utilize the protective strip 12 with airfoils that are thinner and lighter than would be possible with traditional MLEs. Such reductions in airfoil thickness are predicted to provide, in certain circumstances, approximately 0.26% improvement in fan efficiency (measured as energy required by a fan blade to transfer a unit volume of air). After factoring in any efficiency losses that may arise due to design requirements of blade stacks using higher-density MLE's, overall improvements in specific fuel consumption are estimated to be about 0.1%.

Examples of particularly suitable compositions for the strip 12 include certain nickel-based alloys commercially available under the name Inconel®. As a non-limiting example, the reported composition ranges of Inconel 718 are, by weight: 50-55% nickel, 17-21% chromium, 2.8-3.33% molybdenum, 4.75-5.5% niobium, 0-1.0% cobalt, 0.65-1.15 titanium, 0.2-0.8% aluminum, 0-0.35% manganese, 0-0.3% copper, 0-0.08% carbon, 0-0.006% boron, the balance iron and incidental impurities. Other particularly suitable alloys for the strip 12 include stainless steels, a non-limiting example of which is 15-5PH stainless steel. Typical composition ranges, by weight, for 15-5PH stainless steel are: 14-15% chromium, 3.5-5.5% nickel, 0-0.45% niobium, 2.5-4.5% copper, up to 0.07% carbon, up to 1.00% silicon, up to 1.00% manganese, the balance iron and incidental impurities. On a comparative basis, the aforementioned alloys offer a density increase of approximately 75%, over traditional titanium-based MLE materials. Such higher densities assist in increasing the blade pre-stress condition under a rotational field, which promotes the ability of the blade 10 to dynamically resist the tendency to deform under impact loading. Inconel 718 and 15-5PH offer an increase in yield strength of approximately 15-30%, and about 70% increase in elastic modulus compared to titanium. Hence, these high-strength materials resist the tendency for the protective strip 12 to deflect and transfer strains into the underlying composite blade 10. The combination of the properties described here allow for a thinner overall strip 12 to have roughly the same or an improved capability over a traditional blade with a titanium-based metal leading edge.

An airfoil with a protective strip 12 of this invention can be made as described in the following process. An airfoil (such as the airfoil of the blade 10) is formed of a polymer matrix composite, which undergoes curing at a primary cure temperature, a nonlimiting example being about 325° F. (about 163° C.). A protective strip 12 is formed of a nickel-base alloy or a stainless steel alloy, for example, using a creep forming process or milling. The protective strip 12 is then attached to the airfoil using a thermosetting adhesive that is curable at a secondary cure temperature below the primary cure temperature at which the polymer matrix composite of the airfoil was cured. For example, such a secondary cure temperature may be in a range of about 200-250° F. (about 93-121° C.). The secondary cure operation forms an adhesive bond between the airfoil and the protective strip 12. As previously noted, this lower temperature cure gives rise to lower residual stresses in the airfoil-protective strip assembly.

While the invention has been described in terms of specific embodiments, including particular compositions and properties of the alloys and the metallic leading edges made therefrom, it is apparent that other forms could be adopted by one skilled in the art. Accordingly, it should be understood that the invention is not limited to the specific disclosed embodiments. Therefore, the scope of the invention is to be limited only by the following claims.

The invention claimed is:

1. A polymeric matrix composite airfoil assembly for a turbomachine, the polymeric matrix composite airfoil assembly comprising:
 a polymeric matrix composite airfoil which is cured at a first temperature; and
 a metal leading edge protective strip formed from a stainless steel alloy or a nickel-based alloy,
 wherein the metal leading edge protective strip is attached to the polymeric matrix composite airfoil using an adhesive that is curable at a second temperature below the first temperature at which the polymeric matrix composite airfoil is cured.

2. The polymeric matrix composite airfoil assembly of claim 1, wherein the stainless steel alloy consists of, by weight, 14-15% chromium, 3.5-5.5% nickel, 0 0.45% niobium, 2.5-4.5% copper, up to 0.07% carbon, up to 1.00% silicon, up to 1.00% manganese, the balance iron and incidental impurities.

3. A method of adhering a protective strip to a polymeric matrix composite airfoil to form a polymeric matrix composite airfoil assembly, the method comprising the steps of:
 curing a polymeric matrix composite airfoil at a first temperature;
 attaching a metal leading edge protective strip to the polymeric matrix composite airfoil using an adhesive; and
 curing the adhesive at a second temperature to form a bond between the metal leading edge protective strip and the polymeric matrix composite airfoil, wherein the second temperature is lower than the first temperature.

4. The method according to claim 3, wherein the protective strip is made using a creep forming process or milling.

5. The method according to claim 3, wherein the protective strip is comprised of a stainless steel alloy consisting of, by weight, 14-15% chromium, 3.5-5.5% nickel, 0-0.45% niobium, 2.5-4.5% copper, up to 0.07% carbon, up to 1.00% silicon, up to 1.00% manganese, the balance iron and incidental impurities.

* * * * *